United States Patent
Dawson

(10) Patent No.: US 7,428,747 B2
(45) Date of Patent: Sep. 23, 2008

(54) SECURE CHANNEL RESERVATION

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 719 days.

(21) Appl. No.: 11/042,668

(22) Filed: Jan. 25, 2005

(65) Prior Publication Data

US 2006/0164290 A1      Jul. 27, 2006

(51) Int. Cl.
*H04L 9/32* (2006.01)
*G06F 15/16* (2006.01)

(52) U.S. Cl. .................. 726/2; 726/3; 726/14

(58) Field of Classification Search ........... 726/2–3, 726/22, 14; 370/341, 348; 380/255, 270
See application file for complete search history.

(56) References Cited

U.S. PATENT DOCUMENTS

| | | | |
|---|---|---|---|
| 6,768,721 B1 | 7/2004 | Schmitz et al. | |
| 6,842,460 B1 | 1/2005 | Olkkonen et al. | |
| 7,002,943 B2 * | 2/2006 | Bhagwat et al. | 370/338 |
| 7,205,938 B2 * | 4/2007 | Davi et al. | 342/451 |
| 7,277,404 B2 * | 10/2007 | Tanzella et al. | 370/310 |
| 2003/0217289 A1 | 11/2003 | Ammon et al. | |
| 2004/0054897 A1 | 3/2004 | Dawson et al. | |
| 2004/0252837 A1 | 12/2004 | Harvey et al. | |

OTHER PUBLICATIONS

Jim Geier, "802.11 Beacons Revealed", from wi-fiplanet web site, Oct. 31, 2002.

* cited by examiner

*Primary Examiner*—Hosuk Song
(74) *Attorney, Agent, or Firm*—Miller Patent Services; Jerry A. Miller

(57) ABSTRACT

A beacon method for use in a wireless communication network involves populating a beacon frame's channel identification data with accurate data associated with use of a particular channel for wireless communication; populating the beacon frame's network identification data with data including at least one false data element, where the beacon network identification data are intended to identify the network using the particular channel; storing the beacon frame in a computer readable storage medium; and transmitting the beacon frame over a channel to be reserved. This abstract is not to be considered limiting, since other embodiments may deviate from the features described in this abstract.

21 Claims, 2 Drawing Sheets

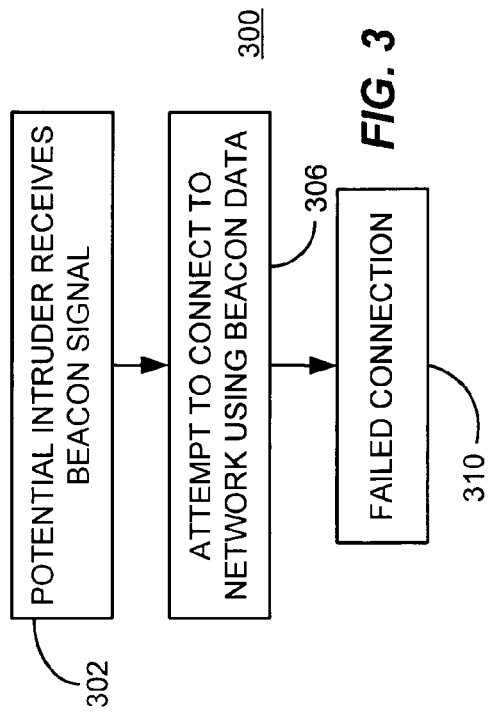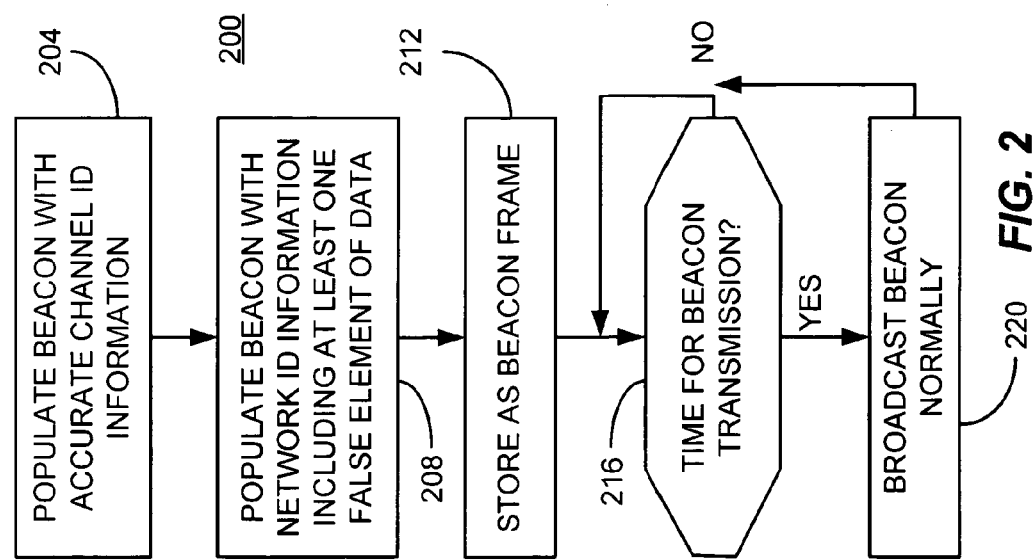

SECURE CHANNEL RESERVATION

BACKGROUND

Many wireless systems provide enhanced security from outside hacking beyond the encryption provided by the 802.11 standard. This additional security often involves not emitting beacon signals from the access point. This provides a measure of security in that an intruder must be able to identify the wireless network in order to intrude. Unfortunately, by not transmitting the beacon signals from the access point other wireless networks may be unaware that the wireless system exists.

One problem with this technique is that the channel used by the secure system appears to be available to other wireless networks by virtue of absence of the beacon. Other networks usually check for a beacon signal before choosing a channel for operation and attempting to use it. The 802.11.h standard describes measuring channel occupancy to avoid channels that are in use by another network. This security technique, thus, provides enhanced security, but may inherently result in increased interference by virtue of another network being set up to use the same channel. This will be a growing problem as the number of wireless access points proliferates.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2 is a flow chart depicting operation of certain embodiments consistent the present invention.

FIG. 3 is a flow chart depicting an intruder's attempted access to a network protected in accordance with certain embodiments consistent with the present invention.

FIG. 4 is a block diagram of a local area network (LAN) consistent with certain embodiments of the present invention.

DETAILED DESCRIPTION

Figure 1:
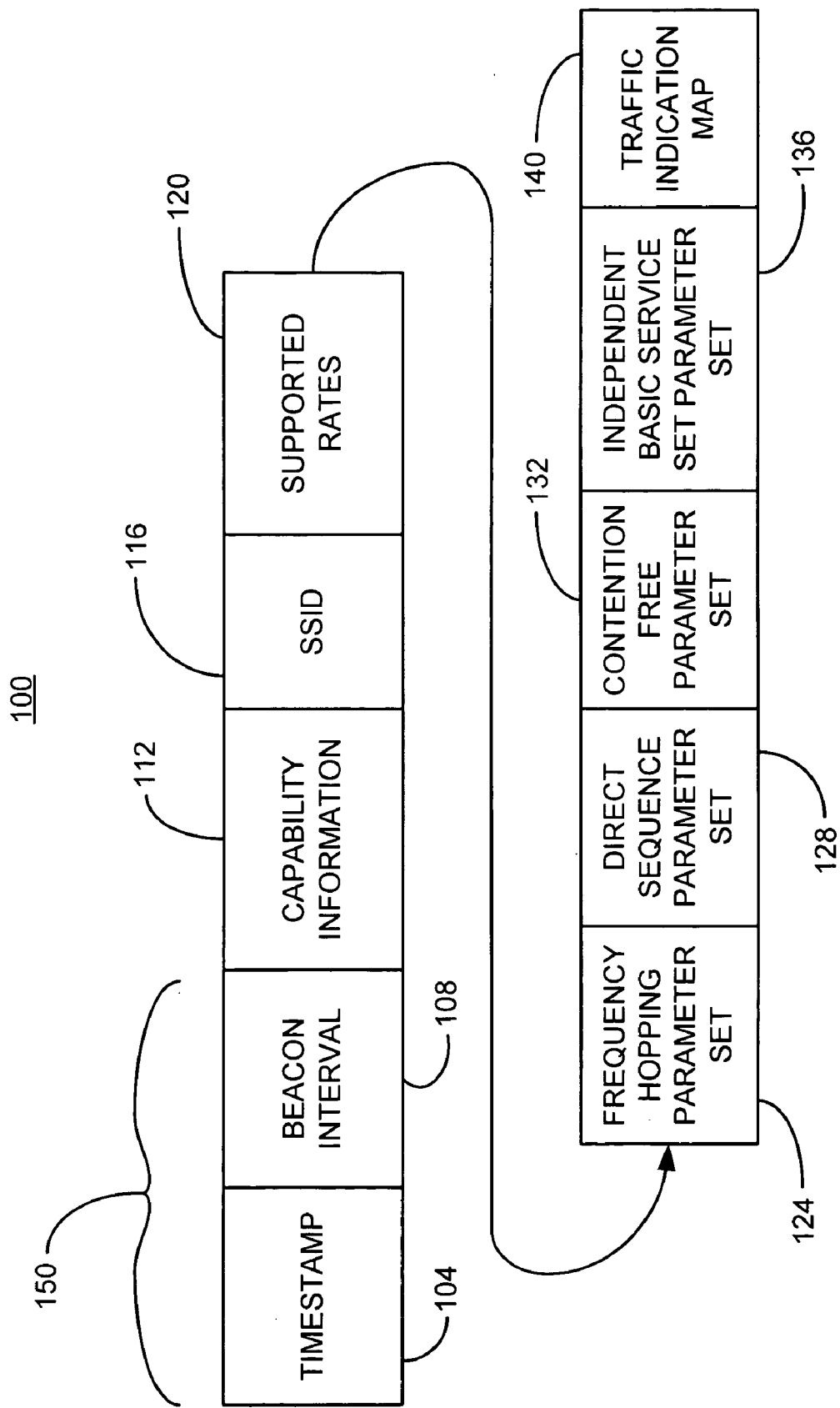
FIG. 1 is a diagram illustrating an exemplary beacon signal such as that used in IEEE 802.11 networks consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

In accord with certain embodiments, this invention utilizes falsified beacon data to reserve a channel for wireless operations while providing security to a network utilizing the particular channel. A nearby network attempting to secure a channel for operation will detect the beacon and know that the channel is occupied, but an intruder attempting to connect to the secure network through the access point will find useless data in the beacon signal and will be thwarted from making the connection.

This allows the secure system to reserve the channel for wireless operations while not providing connection information through the beacon signal. It should be noted that even if other devices can see the beacon signal they typically cannot connect to the access point because of the WEP key/encryption and authentication procedure of the 802.11 standard. However, the WEP key system is considered by some to be too weak and thus the need for additional security measures. It should also be noted that although this description uses the 802.11 beacon as an exemplary embodiment, other embodiments could be devised for any similar communication arrangement that utilizes a similar beacon signal, such as for example, the so-called "HyperLAN" wireless local area network (LAN) standard.

Turning now to FIG. 1, the format of an exemplary IEEE 802.11 standard beacon signal 100 is depicted. Some variation is possible, but such a signal generally has a timestamp 104 indicating what time the beacon is transmitted and a beacon interval 108 defining the frequency of repetition of the beacon signal. The beacon signal also includes capability information 112 that indicates certain requirements for joining the network. The beacon signal further includes an SSID (Service Set Identifier) 116 that identifies the LAN, supported rates 120 indicating the data rates supported. The beacon signal further includes parameter sets 124, 128, 132 and 136 that provide protocol data for frequency hopping (FH) parameters 124, direct sequence (DS) parameters 128, a contention free (CF) parameters 132 and independent basic service set (IBSS) parameters 136. Finally, the beacon signal incorporates a traffic indication map (TIM) 140. Those skilled in the art will understand the particulars of these parameters and data, and thus a detailed explanation is unnecessary. The published IEEE 802.11 standards can also be referenced for further information. The present invention should not be considered to be limited by this exemplary beacon format.

For purposes of embodiments consistent with the present invention, the beacon signal can be divided into two parts, channel identification information 150 and network identification/other information. In the present example, in order for the access point to reserve the channel the beacon signal for the channel to be reserved need only transmit a beacon signal which 1) is transmitted on the proper channel, 2) contains accurate channel identification information, and 3) appears to be a proper beacon signal (i.e., the network identification/other information should appear to be valid data).

Hence, by placing falsified information in at least a portion of the channel identification section of the beacon signal, an intruder cannot readily determine certain information necessary to access a network using a particular channel. In accordance with certain embodiments consistent with the present invention, certain of the channel identification information is thus falsified in such a manner that a casual listening node would appear to see a valid beacon. This reserves the channel while not divulging accurate channel identification information.

Thus, a beacon frame for use in a wireless communication network, consistent with certain embodiments has a channel identification section containing data which are accurately associated with use of a particular channel for wireless communication, and a network identification section containing data including at least one false data element, where the beacon network identification data are intended to identify the network using the particular channel.

In order to reserve the channel, therefore, while not divulging the information that would make it easy for an intruder to intrude upon the network, the exemplary process 200 depicted in FIG. 2 can be followed at a wireless access node. At 204, the beacon is populated with accurate channel identification information. At 208, the population of the beacon frame is completed incorporating at least one false element of data, and preferably much or all of the data should be falsified. This data are then stored in any suitable storage medium as the beacon frame at 212, and whenever the beacon signal is due for transmission at 216, the stored beacon frame is retrieved and broadcast at 220.

Thus, a beacon method for use in a wireless communication network consistent with certain embodiments, involves populating a beacon frame's channel identification data with accurate data associated with use of a particular channel for wireless communication; and populating the beacon frame's network identification data with data including at least one false data element, where the beacon network identification data are intended to identify the network using the particular channel.

In other embodiments, a beacon method for use in a wireless communication network involves populating a beacon frame's channel identification data with accurate data associated with use of a particular channel for wireless communication; populating the beacon frame's network identification data with data including at least one false data element, where the beacon network identification data are intended to identify the network using the particular channel; storing the beacon frame in a computer readable storage medium; and transmitting the beacon frame over a channel to be reserved.

In another embodiment, a beacon method for use in a wireless communication network involves populating a beacon frame's channel identification data with accurate data associated with use of a particular channel for wireless communication, wherein the channel identification data include at least one of a timestamp and a beacon interval; populating the beacon frame's network identification data with data including at least one false data element, where the beacon network identification data are intended to identify the network using the particular channel, and wherein the network identification data include at least one of a capability information, service set identifier, supported rates, frequency hopping parameter set, direct sequence parameter set, contention free parameter set, independent basic service set parameter set and at traffic indication map; storing the beacon frame as an IEEE 802.11 format beacon frame in a computer readable storage medium; and transmitting the beacon frame over a channel to be reserved using a network access point transmitter.

An issue that immediately arises is then how to allow an authorized wireless client into the system when the beacon data is bogus. The solution, is that this data can be entered manually or using any other technique at each authorized station. One such technique is described in published U.S. patent application publication number US2004/0054897, to Dawson, et al., published Mar. 18, 2004 which is hereby incorporated by reference. The only caveat that should be followed is that stations should be set to prohibit the station from automatically refreshing the network identification/other information from a received beacon signal. Another technique that can be used is to deterministically transmit accurate beacon information that can be utilized by stations to connect to the network. This can also be accomplished manually or automatically on a predefined cycle or for a predefined time period.

Another issue is channel tracking. There may be a situation where the access point wishes to command the devices connecting to it to switch to another channel. The reason may range from interference causing low bandwidth, high pack error rates and the like. This can be accommodated by having the bogus beacon data contain an encrypted section in the ignorable element ID section (traffic maps, count bitmap data). The Element ID section of the beacon signal (not shown in FIG. 1) is not required data and is often ignored. The encrypted data in the Element ID section is unintelligible to everyone else but actually contains encrypted data. The secure system clients can decrypt this data to receive information normally transmitted in other parts of the beacon signal.

The system may use any suitable mechanism to indicate the data in the beacon signal to the clients to allow connection other than a wireless connection. For example, a memory stick™, USB data device, diskette, wired Ethernet, manual data entry or other means may be used to tell the client the information needed to use the secure access point. In this case, the beacon data can always be bogus and correct beacon data need never be sent. It is noted that this approach could be used not only to reserve the channel in use, but also to reserve additional channels though additional bogus beacon signals When a bogus beacon signal such as that described herein is utilized, an intruder will be (at least initially) thwarted from attempts to access the network as depicted process 300 in FIG. 3. At 302, the potential intruder receives a beacon signal and attempts to connect to the network using the data in the beacon signal at 306. This, however, only results in a failed connection at 310. While more sophisticate hacking techniques may ultimately successfully be employed by a determined hacker, it is generally the case that malicious hackers are seeking to intrude into networks where doing so is easy. The present technique, thus, provides a significant layer of protection to the network while preventing the potential interference caused by simply not transmitting the beacon signal.

This process is generally carried out at an access point for a LAN such as LAN 400 of FIG. 4. Access point 404 contains a processor and transceiver utilized in a conventional manner to provide access point functions, except that the programming incorporates the process depicted in FIG. 2. This access point is used for communications among stations 1, 2 and 3 shown as 408, 412 and 416 respectively. Access point 404 may be a part of a wireless router or part of a server arrangement or any other device serving the purposes of a wireless access point without limitation. The beacon frame is created in this embodiment with the assistance of a processor 430 and stored in memory 434. At the appropriate beacon transmission interval, the beacon frame is broadcast to the stations using transmitter 440.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. It is contemplated that the process will generally be carried out by a wireless access point, node server or other wireless point of entry for a LAN. Those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A beacon method for use in a wireless communication network, comprising:
    populating a beacon frame's channel identification data with accurate data associated with use of a particular channel for wireless communication;
    populating the beacon frame's network identification data with data including at least one false data element, where the beacon network identification data are intended to identify the network using the particular channel; and
    wherein the network identification data include at least one of a capability information, service set identifier, supported rates, frequency hopping parameter set, direct sequence parameter set, contention free parameter set, independent basic service set parameter set and at traffic indication map.

2. The method according to claim 1, further comprising transmitting the beacon frame over a channel to be reserved.

3. The method according to claim 2, wherein the beacon frame is transmitted at a transmitter forming a part of a network access point.

4. The method according to claim 1, further comprising storing the beacon frame in a computer readable storage medium.

5. The method according to claim 1, wherein the beacon frame comprises an IEEE 802.11 format beacon frame.

6. The method according to claim 1, wherein the channel identification data include at least one of a timestamp and a beacon interval.

7. A computer readable storage medium storing instructions which, when executed on a programmed processor, carry out a process according to claim 1.

8. A beacon method for use in a wireless communication network, comprising:
    populating a beacon frame's channel identification data with accurate data associated with use of a particular channel for wireless communication;
    populating the beacon frame's network identification data with data including at least one false data element, where the beacon network identification data are intended to identify the network using the particular channel, wherein the network identification data include at least one of a capability information, service set identifier, supported rates, frequency hopping parameter set, direct sequence parameter set, contention free parameter set, independent basic service set parameter set and at traffic indication, map;
    storing the beacon frame in a computer readable storage medium; and
    transmitting the beacon frame over a channel to be reserved.

9. The method according to claim 8, wherein the beacon frame is transmitted at a transmitter forming a part of a network access point.

10. The method according to claim 8, wherein the beacon frame comprises an IEEE 802.11 format beacon frame.

11. The method according to claim 8, wherein the channel identification data include at least one of a timestamp and a beacon interval.

12. A beacon method for use in a wireless communication network, comprising:
    populating a beacon frame's channel identification data with accurate data associated with use of a particular channel for wireless communication, wherein the channel identification data include at least one of a timestamp and a beacon interval;
    populating the beacon frame's network identification data with data including at least one false data element, where the beacon network identification data are intended to identify the network using the particular channel, and wherein the network identification data include at least one of a capability information, service set identifier, supported rates, frequency hopping parameter set, direct sequence parameter set, contention free parameter set, independent basic service set parameter set and at traffic indication map;
    storing the beacon frame as an IEEE 802.11 format beacon frame in a computer readable storage medium; and
    transmitting the beacon frame over a channel to be reserved using a network access point transmitter.

13. A beacon frame for use in a wireless communication network, comprising:
    a channel identification section containing data which are accurately associated with use of a particular channel for wireless communication;
    a network identification section containing data including at least one false data element, where the beacon network identification data are intended to identify the network using the particular channel; and
    wherein the network identification data include at least one of a capability information, service set identifier, supported rates, frequency hopping parameter set, direct sequence parameter set, contention free parameter set, independent basic service set parameter set and at traffic indication map.

14. The beacon frame according to claim 13, transmitted over a channel to be reserved.

15. The beacon frame according to claim 13, stored in a computer readable storage medium.

16. The beacon frame according to claim 13, wherein the beacon frame comprises an IEEE 802.11 format beacon frame.

17. The beacon frame according to claim 13, wherein the channel identification data include at least one of a timestamp and a beacon interval.

18. The beacon frame according to claim 13, wherein the network identification data include at least one of a capability information, service set identifier, supported rates, frequency hopping parameter set, direct sequence parameter set, contention free parameter set, independent basic service set parameter set and at traffic indication map.

19. A network access point for use in a wireless communication network, comprising:
   means for populating a beacon frame's channel identification data with accurate data associated with use of a particular channel for wireless communication;
   means for populating the beacon frame's network identification data with data including at least one false data element, where the beacon network identification data are intended to identify the network using the particular channel, wherein the network identification data include at least one of a capability information, service set identifier, supported rates, frequency hopping parameter set, direct sequence parameter set, contention free parameter set, independent basic service set parameter set and at traffic indication map;
   a memory for storing the beacon frame in a computer readable form; and
   a transmitter for transmitting the beacon frame over a channel to be reserved.

20. The apparatus according to claim 19, wherein the beacon frame comprises an IEEE 802.11 format beacon frame.

21. The apparatus according to claim 19, wherein the channel identification data include at least one of a timestamp and a beacon interval.

* * * * *